Sept. 28, 1954  L. A. WILSON ET AL  2,690,222
MARK SENSING REPRODUCER
Filed Aug. 19, 1950  10 Sheets-Sheet 1

INVENTORS
L.A. WILSON, J.E. DAYGER
P.V. BABEL, L.A. STANTON
BY
J. W. Armbruster
ATTORNEY Sept. 28, 1954　　　L. A. WILSON ET AL　　　2,690,222
MARK SENSING REPRODUCER Filed Aug. 19, 1950　　　　　　　　　　　　　10 Sheets-Sheet 3

INVENTORS
L. A. WILSON, J. E. DAYGER
P. V. BABEL, L. A. STANTON
BY
J. W. Armbruster
ATTORNEY Sept. 28, 1954

L. A. WILSON ET AL 2,690,222

MARK SENSING REPRODUCER

Filed Aug. 19, 1950

INVENTORS
L.A.WILSON, J.E.DAYGER
P.V.BABEL, L.A.STANTON
BY
J.W. Armbruster
ATTORNEY Sept. 28, 1954     L. A. WILSON ET AL     2,690,222
MARK SENSING REPRODUCER
Filed Aug. 19, 1950     10 Sheets-Sheet 5

INVENTORS
L.A. WILSON, J.E.DAYGER
P.V. BABEL, L.A.STANTON
BY
J.W. Armbruster
ATTORNEY Patented Sept. 28, 1954

2,690,222

UNITED STATES PATENT OFFICE 2,690,222

MARK SENSING REPRODUCER

Lawrence A. Wilson, Garden City, Jonas E. Dayger, Binghamton, Paul V. Babel, Vestal, and Leslie A. Stanton, Binghamton, N. Y., assignors to International Business Machines Corporation, New York, N. Y., a corporation of New York Application August 19, 1950, Serial No. 180,354

6 Claims. (Cl. 164—115)

This invention relates generally to record-making devices and more specifically to a reproducer to punch cards and operated under control of a marked document.

The invention is illustrated in connection with census work in which a large double-decked record (about twice the usual 3¼" x 7⅜" size) is marked on both sides on vertical tandem decks by the census taker and forms the original document which is sensed to control the perforation of standard 80 column, 12 place code-type IBM accounting machine cards. What is meant by the terms usual, ordinary or standard IBM card is a card of about .007" stock, rectangular in form and 3¼" high by 7⅜" long and marked with index points arranged for receiving rectangular perforations, said points being arranged in 12 horizontal rows spaced apart ¼ of an inch and representing 9, 8, 7, 6, 5, 4, 3, 2, 1, 0, X, Y in that order from the bottom to the top, there being 80 vertical columns of such points spaced apart about 3/32 of an inch and upon which numerals are represented by single rectangular perforations in the column positions 0–9 and alphabetic characters being represented by combinations of two perforations one in the 9–0 positions and the other in one of the 0, X or Y positions.

The main object of the invention is to provide means for producing a compact perforated record from an original marked document. When a record such as a census slip or meter record is made by pencilling in areas indicative of data readings, it is advisable that such a marked record should be larger than the well-known form of 80-column 12-place code perforated card known as an IBM card. By using a record area approximately twice as large as the usual tabulating card and by using both back and front of such a document it is possible to devote approximately four times the area of a perforation index point for the pencilled area of a single notation for the census record or meter reading. Therefore, by providing a mechanism for sensing such a large record and controlling perforation of a standard 80-column record it is made easier for the census taker to mark the original document.

Another object of the invention is the provision of means for distinguishing between mark receiving areas and written matter areas on the document. A column of index points on the document may be short and limited in scope to allow for written or printed data such as names, addresses, dates or other identifications. Then there is need to avoid sensing the written matter and only sense the mark areas. This is done by employing a multiple element electronic control device in which the control elements are both conditioned normally to keep the device non-conductive. Then one element is prepared for impulsing only while the index point area is sensed as distinctive from the written area, and the other element is impulsed on encountering a mark and the device then impulses a punch control relay.

It is also an object to so design a large mark-receiving record so that it is adapted to control standard row by row sensed and punched reproducing punching mechanism to perforate a standard tabulating card. The large record is proportioned to be equal in size to two standard cards plus a middle strip extending along the long horizontal axis and equal to the separation area between succeessive standard cards as they pass row by row through a standard reproducer of the kind shown in the Lake Patent Reissue 21,133. The standard card being punched is fed at half the rate of feed of the double sized marked document. In other words, the marked document when passed along the sort axis through such a standard reproducer takes the place of two ordinary successive perforated cards and is analyzed simultaneously in four places, i. e., the double decks in tandem along the axis of feed and both faces of the document.

A standard IBM tabulating card, here being punched, has a height equivalent to thirteen index point spacings. The outside dimensions of such a card are 3¼" x 7⅜" and the twelve rows of index points thereon are spaced apart at intervals of ¼ of an inch between index points. These points are also referred to at times as the cycle points of the machine, i. e., the ten digit cycle points, two special position cycle points and the one extra cycle point representative of the marginal areas at the top and bottom of the succeeding cards. As such standard cards pass through the row by row sensed and punched reproducer they are separated by a space equal to the distance between two successive index points. Therefore, the reproducer operates on a fourteen-point cycle, thirteen points of which is represented by the card height and one point by the separation between successive cards. In conformity with such proportions, the present large marked document is proportioned with a height equal to twenty-seven cycle points which includes double spacing of twelve data-receiving points, two marginal points and one spacing point, and therefore the large record is exactly two and one-thirteenth times the height of a standard record.

An object of the invention is to provide sensing means for simultaneously sensing, as to a row, both decks and both sides or faces of a marked document so that in effect the marked record is equivalent to one eighty-column perforated card. In the sensing device two pairs of lines of sensing brushes are spaced apart fourteen cycle points to sense both decks and sides simultaneously, as to a row, as they cooperate with one marked document. The sensing brushes for opposite sides of the document are staggered in arrangement and the mark-receiving areas are also alternated so that no mark on the top surface is opposite a mark on the bottom surface. The marked document is arranged with four sets of data-receiving areas, two decks on one side and two decks on the other side. Each deck includes twenty columns of twelve index points per column making a total of eighty columns of standard twelve index point positions. The sensing mechanism has four lines of sensing brushes, two lines for the top surface of the record and two lines for the bottom surface of the record. In each line of brushes there are sixty individual brushes with three brushes per set at an index point and twenty index points in a row. Of the three brushes for an index point, the central brush is wired as the common contact point and the two outer brushes are connected together to form the other end of the circuit which is established through either of the two, through the mark to the central brush. Each brush is spaced and guided gy grooves in an insulation rod, said rod being opposite the brushes facing in the other direction and furnishing a blank space between the sets of grooves on which the brush tips rest and become insulated when no record is in the sensing unit. Therefore, the alternation of index point positions on both sides of the document not only improves the chance of making a distinctive mark but also provides an economical way of insulating the brushes in their active and inactive positions.

Another object of the invention is to provide sensing and perforating devices so arranged that the sensing of a marked document is carried out simultaneously with the perforating of a representative card. The machine is so designed that both the upper and lower decks and the bottom and top surfaces of the document are read simultaneously with the operation of a punch to perforate a standard tabulating card. Due to this form of construction, there is eliminated the need for hand feeding, data storage devices and other delay expedients now used in connection with analyzing marked documents and transferring such readings into perforated form.

Claims to the document per se are set forth in the copending application, Serial No. 252,388, filed October 20, 1951, by L. A. Wilson, one of the joint inventors of the present case. Other claims directed to the sensing mechanism are set forth in another copending application, Serial No. 252,389, filed October 20, 1951, by L. A. Wilson, one of the joint inventors in the present application.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a and 1b, when taken together, form a wiring diagram of the electrical controls of the machine.

Figs. 1c and 2 show a sample marked census document, Fig. 1c showing the front face and Fig. 2 showing the rear face.

Referring to Fig. 1c, it is seen that the document D is proportioned with two decks $a$ and $b$ of marked information index points there being twelve posible points in each column of a deck in the standard Hollerith fashion and there being twenty such columns in each of the decks. Each mark-receiving area is defined by a printed rounded rectangular shape to receive a conductive pencil mark. Fig. 2 shows that the same arrangement applies for the other face of document D with the decks $c$ and $d$ also each providing twenty columns of index point positions.

Figure 3:
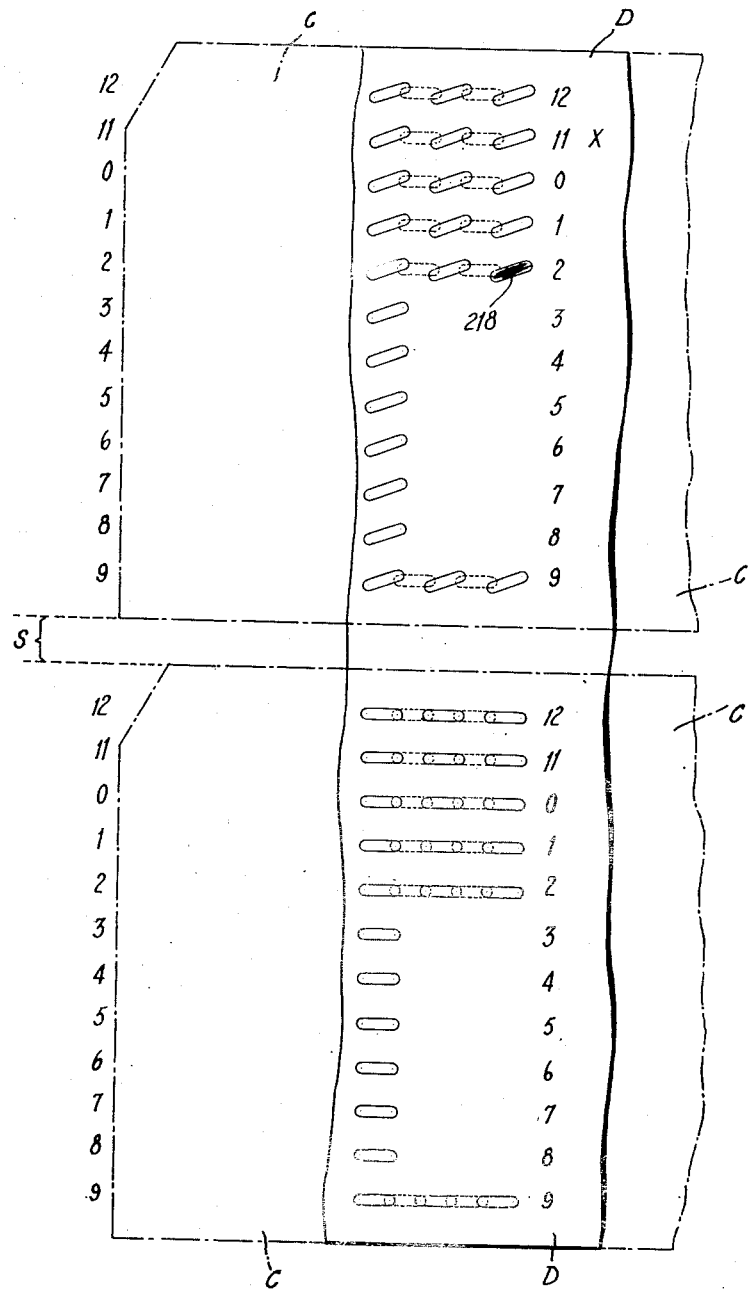
Fig. 3 is a diagrammatic view showing a portion of the marked document and illustrating the alternation of the index points on the upper and lower faces and also revealing the proportions of the document when compared with two standard tabulating cards.

In order to adapt the record for census work the columns are grouped for various designations such as place of birth, language spoken, occupation, etc. The areas for receiving marks indicative of the data being collected are outlined with single and grouped printed areas and marked with digits to further code the information. By referring to Fig. 3, it is noted that such mark-receiving areas are not superimposed on the front and back faces of the document but instead are alternated in placement so that they provide a staggered arrangement, with the document observed on end. In other words, a column of points on the back face is interspersed between two columns of index points on the front face. Therefore, the marks made on one face of the document will occur in comparatively free areas and not interfere with brushes arranged to sense two adjacent areas of the other face of the record.

The marks are made with a special pencil with lead having good electrical conductive qualities so that when a three-pronged brush set is drawn over the moving document and a mark is encountered by the brush set a circuit is established between a central brush 15 and conducted to either or both of the outer brushes 16 of the set.

The large document D (Fig. 3) is proportioned to take the place of two standard cards C as they appear when fed in succession through the reproducer. It is noted that the large document is slightly greater in height than the two cards, the difference being represented by the space S which is equivalent to one index point of space or one cycle point space which is the separation distance existing when standard cards are directed through the reading station of the standard reproducer. Therefore, the single large document D is adapted to take the place of two successive cards in the reproducer, and when read simultaneously on all four decks it is in effect a control equivalent to one eighty-column perforated card. The width of a deck of the large document is exactly that of a standard card and, therefore, the general data-receiving area both back and front is the equivalent roughly of four tabulating cards. Therefore, the marking area is approximately four times that of the perforation receiving area of a standard card and this provides plenty of room for the marks and for the notations associated therewith.

Figure 5:
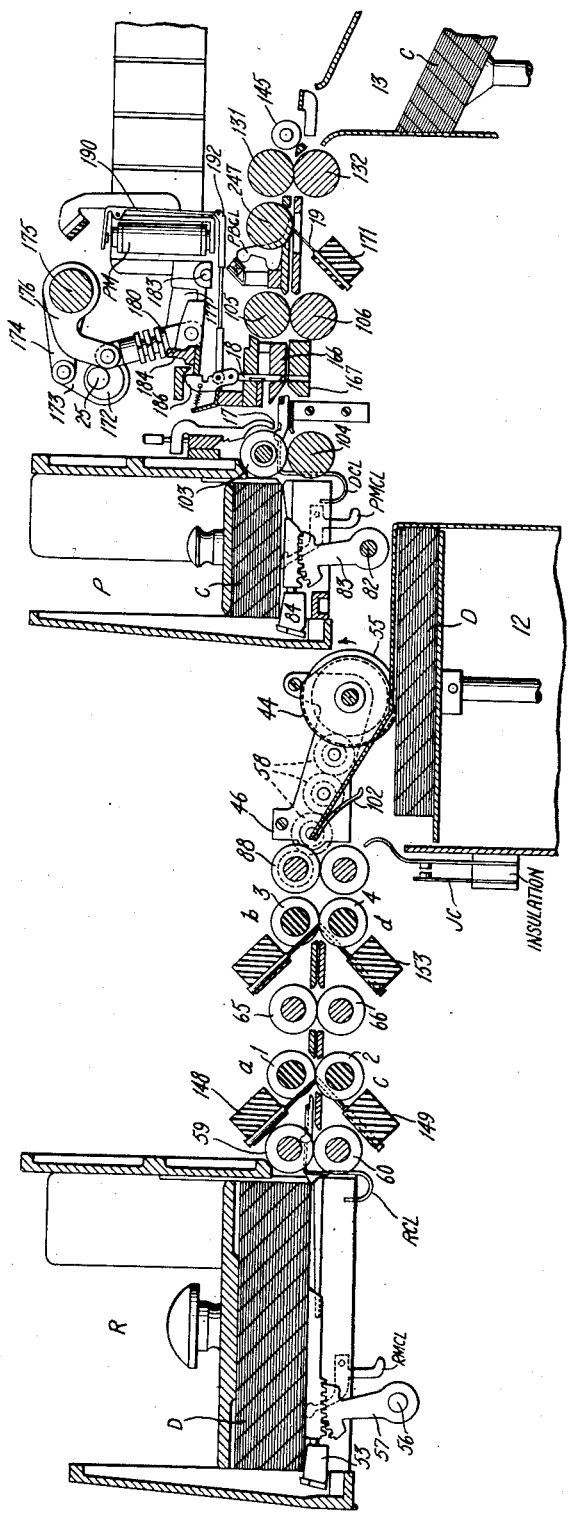
Fig. 5 is a sectional elevation view taken through the center of the entire reproducing machine.

Fig. 5 is the best general showing of the reproducer. There it is seen that the large documents D are fed out of a magazine R and through the lines of brushes a, c and b, d of the read unit before being stacked at 12. Standard size blank cards C are fed from magazine P and under punches 18 of the punch unit and then through auxiliary brushes 19 (used for gang punching) before being stacked at 13. The cards are punched row by row with the "12" row leading, and therefore the document is advanced through the sensing read unit with the top of it leading so that the index points of it are sensed in the order 12, 11, 0, 1, etc. Sensing and punching are carried on simultaneously so that as the four decks of document marks are sensed simultaneously row by row, the related blank card is punched with corresponding data row by row.

Before describing the present system of reproduction from large marked documents, it is believed well to first outline the usual mode of reproducer operation as set forth in Patent Reissue No. 21,133. Ordinarily a punched card is made under control of another punched card. As a perforated pattern card is sensed at the read station a similarly sized blank card is advanced in synchronism therewith through the punch station and perforated row by row to agree with the selected perforations of the pattern card. The related pattern and blank are fed singly but concurrently from both magazines and are then shifted in synchronism across the reading and punching stations before being deposited in their respective stackers. Electrical connections between the reading brushes and the punch controls serve to operate so that when a perforation is sensed in a pattern card a corresponding perforation is punched in the blank card.

The devices of the present invention differ in one respect from the standard reproducer in that the control pattern record is a double sized marked document rather than a standard perforated card. Another difference is occasioned by the fact that the pattern document has four sets of conductive markings in double decks on both sides of the document which requires four sets of mark sensing brushes rather than one set of perforation sensing brushes. Because of the difference in size, only one blank card is fed for two cycles of operation needed to feed the large document. Other points of novelty in the records, sensing devices and electrical controls are explained hereinafter in this specification.

Figure 4:
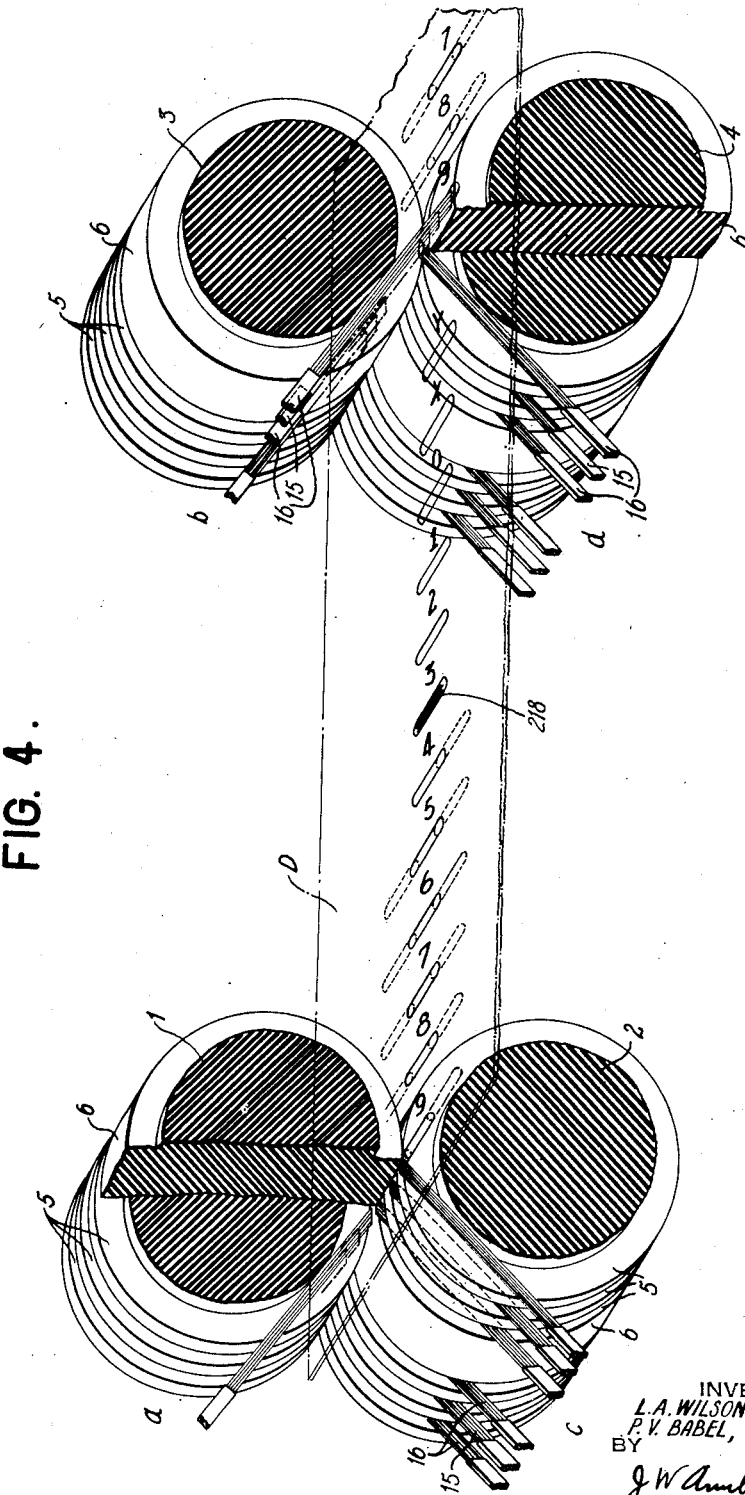
Fig. 4 is a perspective view showing the document sensing unit and revealing how the alternately notched rods separate the sets of mark sensing brushes and provide platforms for the tips of the brushes.

Referring to Fig. 4 it is noted that the four lines of sensing brushes a, b, c and d are arranged in a novel fashion and guided and separated by notched insulation rods 1, 3, 2 and 4. In each pair of oppositely facing lines of brushes, such as the lines a and c, the brushes a for the upper side of the pattern document, are guided by the insulation rod or member 1 but impinge upon rod 2 which also acts as a guide for the brushes c of the lower set. Thus each rod serves for dual purposes of insulating two lines of brushes. Each insulation rod is notched at twenty regular wide intervals with three closely spaced notches 5 for the brush set of one index point. The three closely mounted brushes of a set are wired electrically so that when a document mark spans the tips, a central brush 15 is caused to conduct current from either of the outer brushes 16 and a punch control circuit is established. The sets of brushes are staggered in arrangement, i. e., a top brush set is located between two lower brush sets. In the absence of a document, the tips of the upper brush set normally rest on a blank or unnotched portion 6 of the opposite lower insulation rod. In a similar fashion the lower sets of brushes rest on blank unnotched portions of the opposite upper insulation rod. It is because of the novel arrangement of marked areas in interspersed formation on the pattern document that it is possible to arrange the cooperating sensing devices in such a safe, workable and economical fashion.

The four lines of brushes a, b, c and d shown in Fig. 4 are seen to cooperate with the four decks of marked information on both sides of the document D. As the document is moved from left to right, the four lines of brushes simultaneously read all eighty-columns of coded information. Thus the markings are converted into timed impulses for controlling the operation of punch interposer magnets PM so that eighty columns of information are perforated in a card at the punch station of the reproducer.

Figure 6:
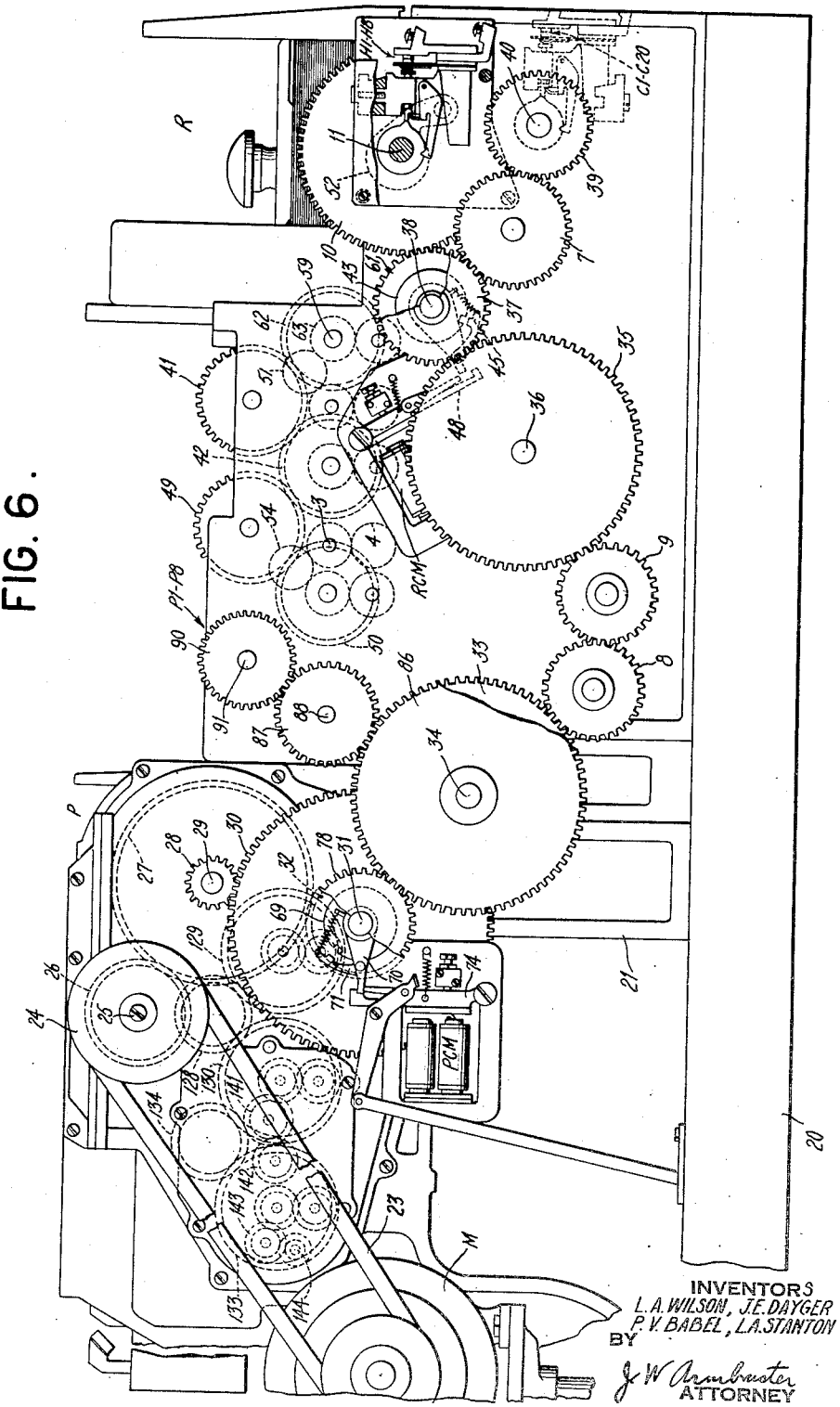
Fig. 6 is a side elevation view showing the driving mechanism for the punching and reading stations of the reproducer.
Figure 7:
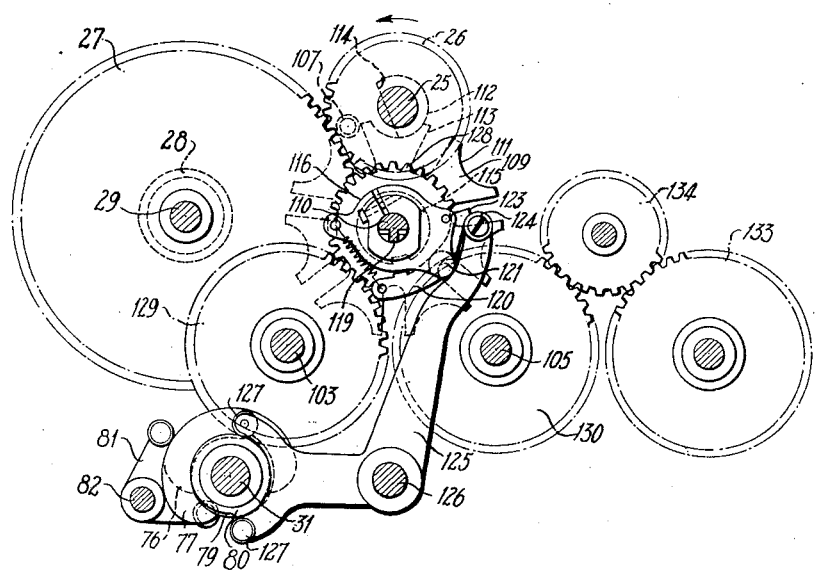
Fig. 7 is a side elevation view showing the driving mechanism for the punch unit.
Figure 8:
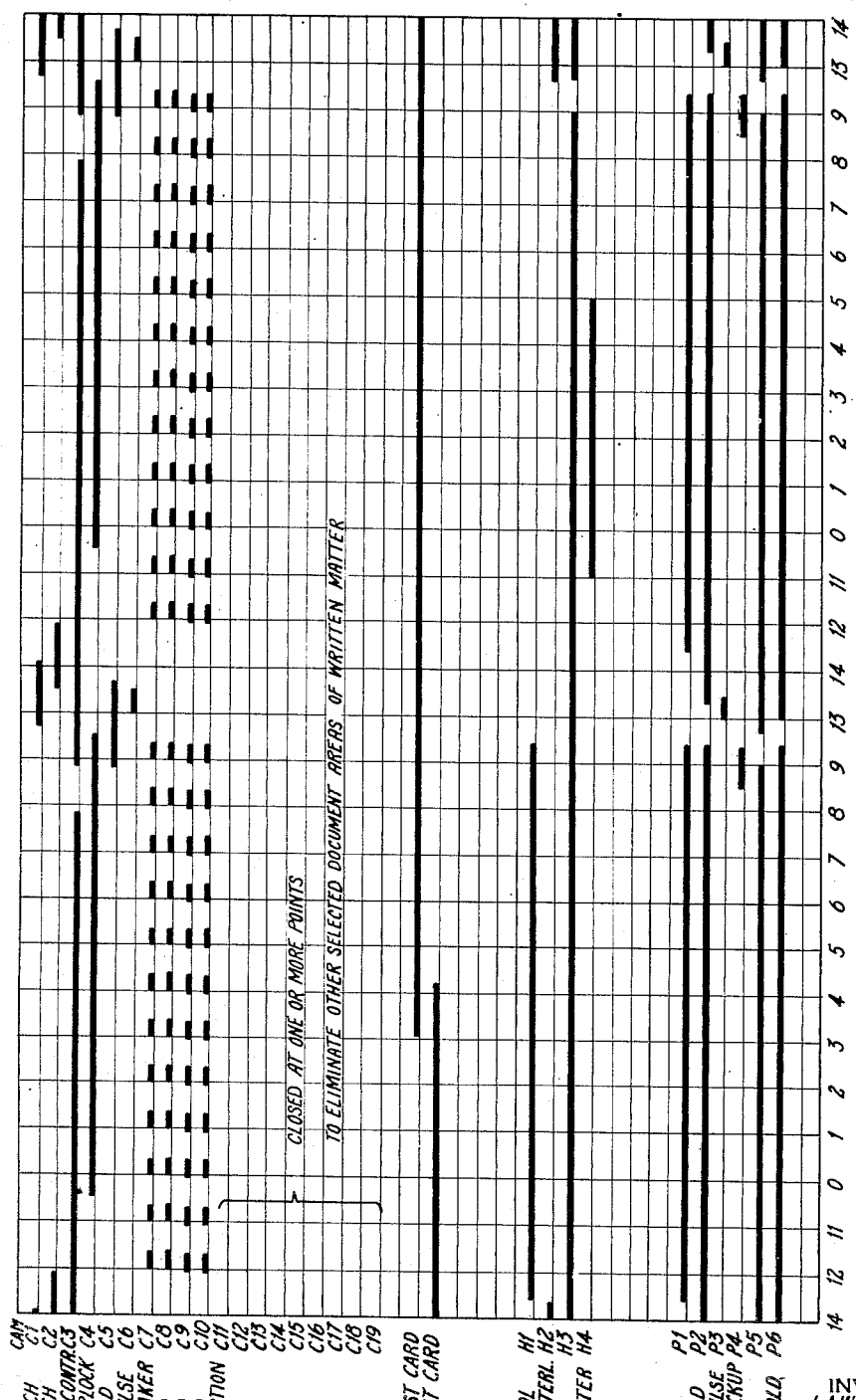
Fig. 8 is a timing chart showing the periods of actuation of the electrical controls for the machine.

Turning now to driving connections of the machine, it is noted that in Fig. 6 a motor M is mounted above the base 20 of the machine which also carries a pair of main side frames 21 and 22. The motor is connected by a driving belt 23 to a pulley 24 on a shaft 25 mounted on bearings in the frame 21. Fixed to the shaft 25 is a gear 26 which serves to drive the continuously running devices of the machine.

Speed reduction gearing is placed between the gear 26 and the card feeding mechanism. The gear 26 meshes with a large gear 27 to which is attached a small gear 28, both being secured to a shaft 29. The small gear meshes with a large punch clutch driving gear 30 which is pivoted on a punch feed drive shaft 31 and attached to another driving gear 32.

Gear connections are provided between the punch clutch under the hopper P and a read clutch under the hopper R, so that cards may be fed from P in alternation with the documents from R but in synchronism out of both hoppers. The gear 32 (Fig. 6) meshes with another gear 33 pivoted at 34. This gear 33 in turn through two idlers 8 and 9 drives a similar gear 35 pivoted at 36. Gear 35 meshes with a reproducer read clutch driving gear 37 on shaft 38.

The gear 37, through an idler 7, drives a gear 39 attached to a shaft 40. Thus this shaft is given a continuous movement. It is used as a mounting for a number of cams cooperating with the cam contacts C1-C20, mentioned hereinafter, and also as a mounting for circuit breakers and emitters.

Gear 37 also drives a large half speed gear 10 on a shaft 11 which has cams for the H cam contacts needed because of the alternate operation of reading and punching control called for by the double size of the document. Shaft 11 also carries a document picker eccentric 52 to feed one document on every other cycle of operation.

Attached to the gear 37 is a clutch disk 43 cooperating with a pawl 45 mounted on an arm attached to shaft 38. One end of the pawl is engaged by an armature latch 46. A spring normally holds the armature latch 46 into engagement with pawl 45, but when the associated read clutch magnet RCM is energized, the latch is moved away from the pawl, which then connects the shaft 38 to the driving gear 37.

The shaft 11 is provided with a cam 52 for operating the document feed picker slides 53 (Fig. 5). A follower bearing on the cam receives a reciprocating motion for each rotation of half speed shaft 11. The follower is attached to a shaft 56 which also carries a pair of gear sectors 57. The sectors mesh with teeth on the bottom of picker slides 53, forming a driving connection therewith. The slides carry a projecting picker knife which is adapted to engage the bottom document in the read hopper.

It is apparent from the described connections in the reproducer clutch that when the magnet RCM is energized the picker 53 is moved to the right (Fig. 5) bringing the bottom pattern record or document D in the hopper R over into cooperation with feeding rollers 59 and 60. There is such a feeding action for every other cycle of operation when reproducing.

The feeding rollers 59 and 60 are driven by a gear 61 (Fig. 6) on shaft 38 in mesh with a gear 62 on roller 59. A smaller gear 63 on roller 59 cooperates with a similar gear on roller 60 so that both rollers are turned simultaneously but oppositely. The rollers extend across the machine between the side frames. When turning, they draw a document D from the hopper and feed it to the right (Fig. 5) between the brushes a, c and b, d and over into other feeding rollers 65, 66 and 96, 97, the driving of which is accomplished through a train of gears driven by gear 62 (Fig. 6) and including gears 41, 42, 49 and 50. Pinions are on ends of both pairs of rollers so that the bottom rollers are driven by the top rollers. Other pinions 51 and 54 act as idlers in being driven by the top roller pinions and in turn drive pinions on the upper insulation rods 1 and 3. They are meshed with pinions on the respective lower rods 2 and 4 to drive the rods in the direction of feed of the document.

In order to aid in stacking the documents D, an intermittently effective roller 44 is pivotally mounted above stacker 12 and driven in a counterclockwise direction to push the documents to the right and insure that they are properly seated on the stacker shelf. A gear 55 is fixed to roller 44 and meshes with the last of a string of idler pinions 58, the first of which meshes with the pinion on feed roller 88.

The punch clutch under hopper P (Fig. 6) is operated on alternate cycles when connections are established between shaft 31 and the driving gear 30. Attached to gears 30 and 32 is a notched disk 69 loose on shaft 31. Adjacent the disk is an arm 70 secured to shaft 31 and carrying a clutch pawl 71 pivoted thereon. The pawl has an extension adapted to fit into the notch in disk 69 and is urged to engage the disk by a spring. However, the pawl is held disengaged by an armature latch 74 which engages an extending arm on the pawl. When the punch clutch magnet PCM is energized, the associated armature is attracted and latch 74 is rocked to the left about its pivot, releasing pawl 61 and connecting shaft 31 to the driving gears.

When the shaft 31 is operated, two driving devices carried thereon are made effective to actuate various card feeding means. A pair of complementary cams 76, 77 (Fig. 5a) serve to drive the card picker mechanism, and another set of complementary cams 79 and 80 act to release a clutch connection in a Geneva gear drive for the card feed.

A two armed lever 81 on shaft 82 carries a pair of rollers cooperating with the related cams 76 and 77. Also attached to the shaft 82 are sector arms 83 (Fig. 5) with gear teeth that mesh with racks on the card picker slides 84. A knife edge attached to the slide is adapted to engage the bottom card in hopper P and move the card to the right, when the picker slides 84 are reciprocated by the cams 76, 77 on shaft 31.

The gear 78 (Fig. 6) is operated each time the punch clutch is operated and it meshes with a gear 86 which is mounted on the same stud 34 with gear 33. Gear 86 meshes with a gear 87 on a stud 88 and meshes with a gear 90 attached to the shaft 91 which carries the cams for operating the cam contacts P1, P2, etc.

There are connections from the driving gear 26 (Fig. 6) to the punch feeding rollers 103, 104, 105 and 106 (Fig. 5) for feeding cards under the punch plungers 18. A roller 107 (Fig. 5a) on a stud extending from the gear 26, forms a means for driving a Geneva step motion gear 109 with an intermittent movement.

The notched gear wheel 109 turns on a short stud 110 adapted to rotate in frame 21, but is locked in each position by the cooperation of a concentric formation 111 at the end of each radial extension with a hub 112 on shaft 25. The roller 107 moves idly for the greater part of the arc about shaft 25 in a counterclockwise direction (Fig. 5a) until it engages in one of the slots 113 in gear 109. The gear is moved with a gradually accelerated and then gradually retarded motion which is stopped as the rollers slips out of the slot. The gear is released for each step of movement by a depression 114 in the side of the hub 112. The depression is presented only when the roller 107 is in position to drive the gear.

A clutch connection is provided between the Geneva gear wheel 109 and the feed rollers so that feeding may be prevented when cards are not to be punched. In Fig. 5a, it is shown that a notched disk 115 is loose on the stud 110 carrying wheel 109. Adjacent the disk is a plate 116 which is split at one side where it is clamped to the stud 110. The plate is adjustably positioned on the shaft by a pair of set screws which are threaded in the plate and extend into cooperation with a tongue 119 cut in the shaft. A clutch pawl 120 is pivoted at 121 on the plate 116. The pawl is spring urged to bring an extension thereon into cooperation with the notch in disk 115. An extending arm 123 on the pawl 120 cooperates with a roller 124 on the end of a lever 125 pivoted on stud 126. The horizontal portion of lever 125 carries a pair of rollers 127 which cooperate with the complementary cams 79 and 80 already mentioned. The cams are designed so that if the punch clutch magnet PCM is not energized and the shaft 31 is not moved, lever 125 is positioned with roller 124 holding pawl 120 out of cooperation with the driving disk 115.

However, should the magnet PCM be energized, the cams 79 and 80 are turned, lever 125 is rocked permitting the engagement of pawl 120 with disk 115, and establishing a driving connection between the Geneva wheel 109 and a gear 128 attached to the disk 115.

The gear 128 meshes with two gears 129 and 130 on feeding rollers 103 and 105 (Fig. 5) respectively. An idler gear 134 (Fig. 5a) between gear 130 and another gear 133, forms the driving connections over to the feed roller 131 (Fig. 5) on which gear 133 is attached. A small gear on roller 103 cooperates with a similar gear on roller 104. The same sort of gear connection is made between gears on rollers 105 and 106, and between gears on rollers 131 and 132, respectively.

An idler gear 141 (Fig. 6) connects a roller gear to a gear 142 on the contact roller 247 (Fig. 5). Another idler gear 143 (Fig. 6) meshes between a roller gear and a pinion 144 attached to a card deflecting reject roller 145 (Fig. 5).

The operation of the document sensing devices may be described in conjunction with tracing the course of a document through the feed rollers. When a group of pattern document cards D (Fig. 5) are placed in the magazine or hopper R, the bottom card depresses the magazine contact lever RMCL closing the associated contacts RMCLC (Fig. 1a) to pick up relay R5. Then, when the picker is operated, the bottom card alone is pushed through the throat and placed between feed rollers 59 and 60 (Fig. 5) which feed the card along between guide plates.

As the document enters the sensing station, a read card lever RCL is operated to close contacts RCLC (Fig. 1a) and pick up relay R4. From there the document passes between the four lines of mark sensing brushes $a$, $b$, $c$ and $d$ comprising eighty brush sets, each set having three brushes with a central brush 15 (Fig. 3) and two outer connected brushes 16. All center brushes 15 are wired separately to the plugboard and there are available for punch control. The plurality of sensing brushes 15 and 16 of a line such as line $c$ (Fig. 5) are arranged in a single line and held in an insulation bar 149 which is supported on the pair of side frames. This bar is removable and carries therewith the related portion of the sensing station. The sensing units carrying brush lines $a$, $b$ and $d$ are constructed in a similar fashion.

The document is advanced to the right by the feed rollers 65, 66 which feed it between the guide plates. A short distance from the brushes $b$ and $d$, the document is engaged by the roller 88 and its opposed roller which eject it. As the card is ejected it is deflected by the tongue 102 and forced into the stacker 12 by the rubber segmental roller 44. If the documents D jam in the stacker, they press against the inner leaf of the jam contacts JC which when closed operate controls to stop the machine and flash a jam light. Other read stacker contacts RSS are opened when the stacker is full, and they are in the running control circuit (Fig. 1a) to stop the machine when documents are piled high in the stacker.

Figure 1A:
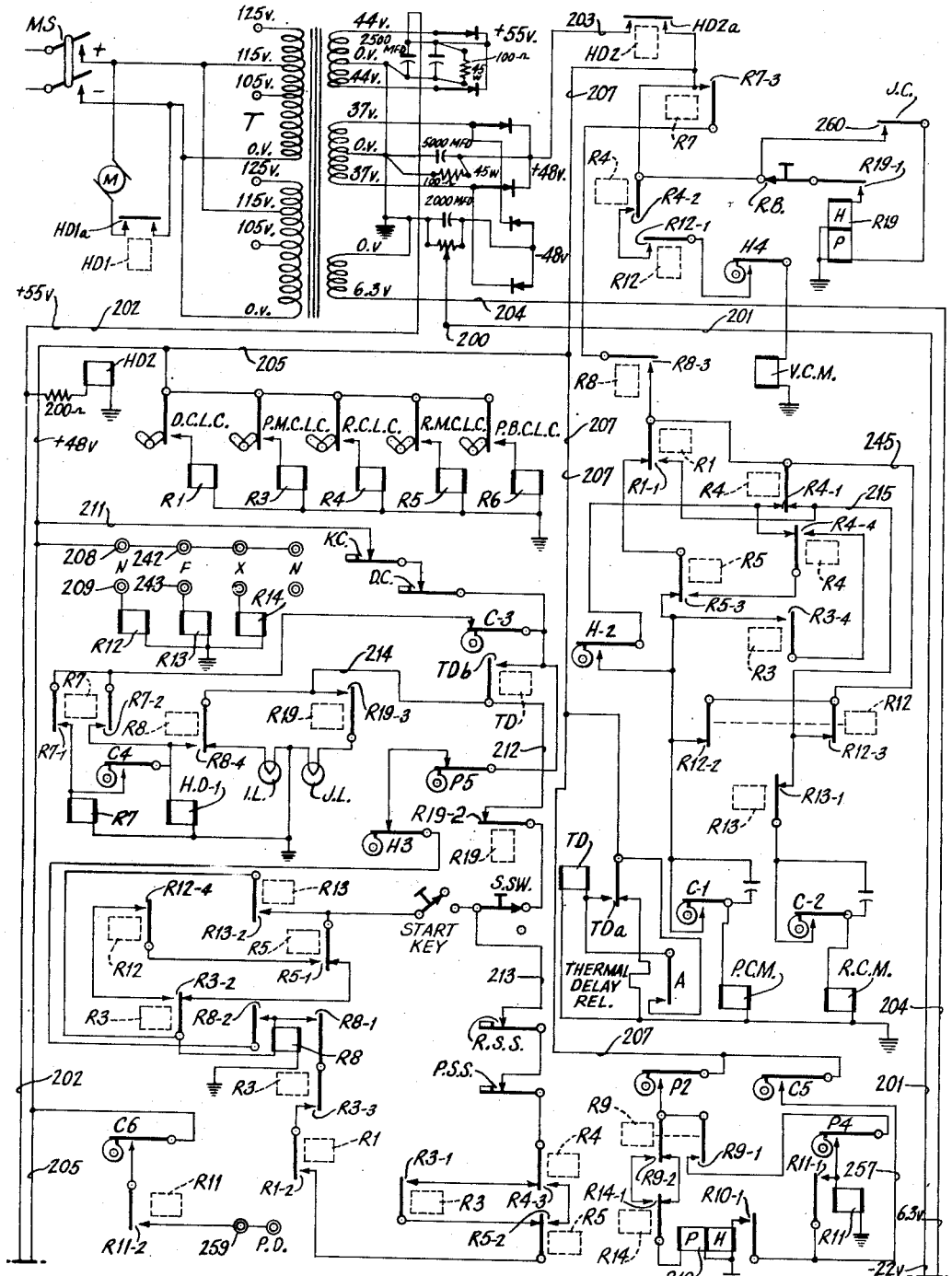

The blank record cards C (Fig. 5) placed in hopper P follow a course through punching and sensing stations before being deposited in stacker 13. The cards in the hopper depress the magazine contact lever PMCL and close the associated contacts PMCLC (Fig. 1a) to call relay R3 into operation. Then, when the picker 84 (Fig. 5) is operated, the bottom card is pushed through the throat and placed between feed rollers 103 and 104 which feed the card along between the punch master card brush 17 and its contact bar. As the card passes, it operates a die card lever DCL for relay R1 (Fig. 1a). The brush 17 is attached to an adjustable frame on a guide bar.

After leaving the master card sensing station, the card is fed between a stripper plate 166 and a die plate 167 secured to the main side frames. Then the card enters between feed rollers 105 and 106 which feed it between guide plates in the punch sensing station. A card lever PBCL is operated as the card passes between sensing brushes 19 and contact roller 247 and thus relay R6 (Fig. 1a) is called into operation. An insulation block holds a common contact brush into contact with the roller 247. A large insulation bar 171 secured between the side frames holds the line of sensing brushes 19 in contact with roller 247. When the card leaves the brushes 19 it its engaged by the rollers 131 and 132 which eject it. As the card is ejected it is deflected by the roller 145 so that it is directed into the card stacker 13.

The selective operation of the punch plungers 18 may be explained with reference to Figs. 5 and 5a. In Fig. 5 it is noted that the shaft 25 is formed with an eccentric which is encircled by an arm 173. The upper end of this arm is pivotally connected to an arm 174 on shaft 175 which is provided with another pair of arms 176 intermediate the side frames. Between these arms 176 and a punch operating bail 177 there is provided an adjustable turn-buckle connection.

The bail 177 is pivoted on studs 183 in the main side frames and carries a punch actuating bar 184 which is adapted to cooperate with notches in any of a plurality of selected interposer pawls 186. Each of the punch plungers 18 has an interposer pawl 186 which is pivotally connected thereto. Normally the pawl is held out of the path of the bar 184 and the plunger is held above the die by a spring attached to the pawl. However, when a punch control magnet PM is energized, the associated pawl is drawn into cooperation with bar 184 and the related plunger is depressed to perforate the card.

The armature of the punch controlling magnet PM is mounted on a lever 190, the lower end of which is pivotally connected to a call wire 192, the other end of which is pivotally connected to a pawl 186. A plurality of such connections are made, one to each pawl, the magnets PM being arranged in staggered rows and columns. As each row of index points on a blank card passes under punches 18, all eighty punch control magnets PM are available to be called into operation by the sensing of a conductive mark by any of the eighty brush sets 15, 16 in all four lines of brushes $a$, $b$, $c$ and $d$, which at the time are reading simultaneously the four decks of points on both faces of the document D.

When attracted, the armature swings the lever 190 in a counterclockwise direction (Fig. 5) and draws the wire 192 to the right, urging pawl 186 into cooperation with bar 184. The controlling magnet PM is energized throughout the punching operation while the card is at the pause in intermittent feeding and while the punch plunger 18 is lowered and raised again and thus will maintain the pawl 186 in engagement with bar 184. As the bail and bar 184 are reciprocated, any of the pawls may be moved over by the call wires until notches therein engage the end of bar 184. Then the connected pawls and plungers are depressed to perforate the card and quickly withdraw therefrom to permit feeding of the card to continue to the next index position.

Figure 1B:
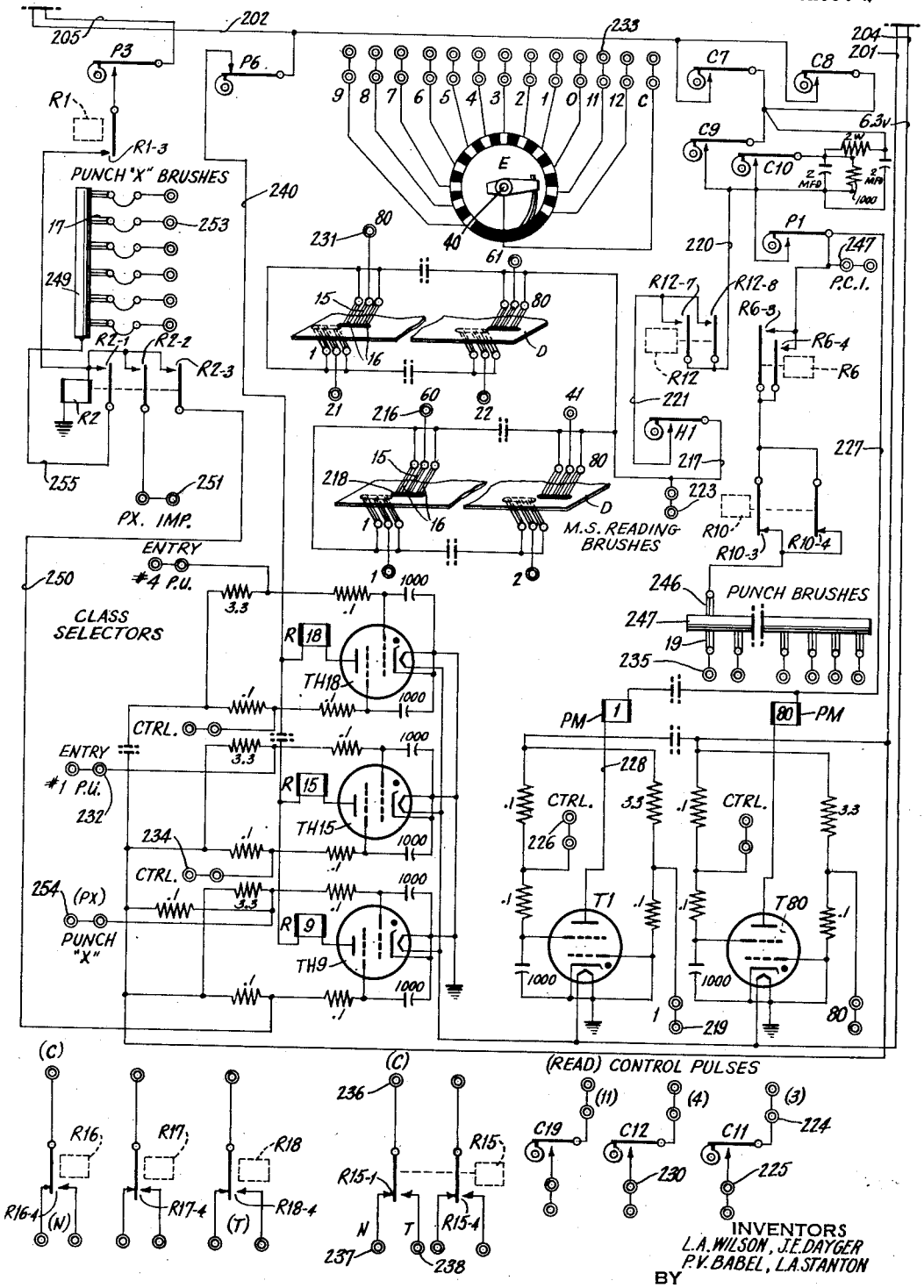

The read clutch RCM has the effect of selectively calling the large gear 10 into operation. And since that gear is connected to the cams for the H cam contacts and the cam for the read magazine picker, documents D are advanced selectively, and control impulses therefrom are used selectively as noted from the wiring description which follows:

The wiring diagram is shown in Figs. 1a and 1b, the former being arranged to be placed directly above the latter to connect common lines.

There are quite a number of changes in the wiring controls over those of the standard reproducer shown in Patent Reissue No. 21,133 but reference may be made thereto for ordinary control circuits. The changes illustrated in the wiring relate partly to variations in timing due to the large size of the marked document necessitating alternation of the feed of the standard blank card out of the punch side of the reproducer because of the need for the time of two card feeding cycles for each document advanced out of the magazine in the reading side of the reproducer. A number of cam contacts designated as H contacts are operated at half speed to provide a 180° cam surface per cycle and to be effective on alternate cycles in controlling perforation while a card is being fed. Other changes are necessitated by the provision of electronic detecting devices for operating the class selection and punch control relays under control of the sensed marks on the document D.

At the top of Fig. 1a, it is noted that the power supply includes the main switch MS which, when closed, calls into operation the motor M through a set of relay contacts HD1a. Connections are also made to the multiple windings of a transformer T, the other windings of which act as a voltage divider for providing the different sources of potential, a certain source for the ordinary operating relays and other sources of potential for the control elements of electronic control devices and the sensing brush currents for effecting a change in bias therein to render the tubes effective for control of punching and class selection punch control. It is seen from the markings on the lines leading out of the full wave rectifiers of the different sources of potential that a line 202 is provided bearing a positive voltage of 55 volts. Another line 203 is provided bearing a positive voltage of 48 volts. Another source is one of negative voltage of 48 volts so tapped by the potentiometer setting at 200 that it is gauged so that line 201 carries a bias control of minus 22 volts for thyratrons of the type identified as 2D21 gas-filled tubes. Line 201 extends to the control and screen grid connections as noted hereinafter. A zero voltage line is connected to a convenient common ground and many of the control relays noted hereinafter are also grounded. Another line 204 is provided to carry a voltage of 6.3 volts to the filaments of all the tubes.

Quite a number of the control circuits are established depending on the presence or absence of documents or blank cards in the two magazines, at the reading station, at the punch die and at the punch brushes. Near the top of Fig. 1a, it is seen that relays R1, R3, R4, R5 and R6 are operated respectively by die card lever contacts DCLC, the punch magazine card lever contacts PMCLC, the read card lever contacts RCLC, the read magazine card lever contacts RMCLC and the punch brush card lever contacts PBCLC. All the contacts of these card levers are connected in parallel to a line 205 which is the 48-volt source connected to line 203 through starting control relay contacts HD2a. Reference to Fig. 5 shows how these various levers are assembled to cooperate with the document and perforated card at various stages in the operation of the reproducer.

Closure of the main switch MS sends current through line 202 and the relay HD2 (at upper left corner, Fig. 1a) is picked up to operate to close the contacts HD2a in series with the lines 203 and 207. Connected on line 207 is a thermal delay relay TD which is delayed in its pickup to allow sufficient time for the filament circuit to heat the filaments of the electronic tubes. After an interval of time has passed, the thermal delay relay TD is energized and operates its own holding circuit through contacts TDa as well as closing contacts TDb (center of Fig. 1a) in series with the start circuit involving relay R8 shown near the bottom left hand corner of Fig. 1a.

Before the start key is pressed, the machine is conditioned for either reproducing operation or a gang punching control operation. In order to be conditioned for reproducing, i. e., sensing of a document and the control of perforation of a blank card, plug connections are made to call into operation a relay R12. Near the middle of Fig. 1a, it is seen that by effecting a plug connection from socket 208 to socket 209, the relay R12 is energized by current through line 205 extending through the relay and to a ground connection. A number of contacts are closed under control of relay R12 in various parts of the controls as an indication of reproducing operation. For example, one set of such contacts R12—1, shown in the upper right portion of Fig. 1a, are in series with read card lever magnet contacts R4—2 and cam contacts H4, and connected to a Veedor Counter magnet VCM which is operated each time a document is reproduced to step a standard counter mechanism for keeping a record of the operations of the machine.

Other contacts R12—3 of the reproducing selection relay R12 are provided in series with the read unit clutch magnet RCM so that in case a jam occurs in the punch feed unit, the removal of the control panel will deenergize relay R12 thus permitting closure of contacts R12-d and permit a circuit to be established to the read clutch magnet RCM so that the documents may be run out in case the die card lever is open and the read card lever is closed.

Another control effected by the selection relay R12 is the one involving the contacts R12—4 in series with the start key contacts ST for a start circuit which is about to be traced.

Upon closure of the start key contacts ST (Fig. 1a), a circuit is completed to the start relay R8 as follows: starting with the 48-volt line 205 and extending through wire 211, the circuit continues through the usual knock-off and die contacts KC and DC. It then passes through the thermal delay contacts TDb and wire 212 to jam control contacts R19—2 normally closed. It then continues through the stop switch contacts SS, and the start key contacts ST, through the transferred read magazine card lever contacts R5—1, the reproducing selection contacts R12—4, the transferred punch magazine card lever contacts R3—2 and through relay R8 to the ground. After the closure of contacts R8—1, the normal hold circuit for the start relay is effective and includes line 205, wire 211, knock-off contacts KC, die contacts DC, the thermal delay contacts TDb, wire 212, jam control contacts R19—2, stop switch contacts SS, wire 213, the normally closed read stacker switch contacts RSS (indicative of ample stacker space), the punch stacker switch contacts PSS, the read card lever contacts R4—3, the read magazine card lever contacts R5—2, the die card lever contacts R1—2, the punch magazine card lever contacts R3—3, relay hold contacts R8—1, and through relay R8 to the ground. Relay R8 will then be held up to complete a cycle through circuit breaker contacts P5 and cam contacts H3 in conjunction with other hold contacts R8—2 after each depression of the start key or when the normal hold circuit is interrupted.

When the start control relay R8 is energized, it acts to transfer the setting of associated contacts R8—4. At the middle of Fig. 1a, it is seen that the normally closed condition of contacts R8—4 serves to direct current through an idle light IL which is an indicator of the state of the control connections in the machine. Upon transferral, contacts R8—4 energize both relay HD1 and relay R7. The circuit through the motor control relay HD1 includes line 205, wire 211, knock-off contact KC, die contact DC, thermal control contacts TDb, wire 214, contacts R8—4 now transferred, and through relay HD1 to the ground. By means of a branch circuit picked up therewith through cam contacts C4, the other relay R7 is also energized.

When relay R7 is energized, it operates associated contacts R7—1 and R7—2 to provide a holding circuit through both relays R7 and HD1 to hold them energized until the connected cam contact C3 opens. This cam contact C3 operates to insure that the machine is stopped at the proper point in the cycle. Relay R7 which may be identified as a motor hold relay also controls other contacts R7—3 in series with the circuits for picking up and holding the read clutch and punch clutch control magnets, the operations of which are about to be explained.

Assuming that no cards are in the machine except those placed in both magazines, then the energization of the two main operating clutches is accomplished as follows: the punch clutch magnet PCM (Fig. 1a) is energized by a circuit including line 203, the main switch relay contacts HD2a, motor holding relay contacts R7—3, the start relay contacts R8—3, the normally closed die card relay contacts R1—1, the normally closed read magazine relay contacts R5—3, cam contacts C1, the punch clutch magnet PCM and a wire to ground.

In a somewhat similar fashion, the read clutch magnet RCM is energized to advance a document through the reading station. The circuit for the read clutch includes line 203, relay contacts HD2a, relay contacts R7—3 and R8—3, the normally closed read card lever contacts R4—1, wire 215 to the normally closed "Reproducer Off" relay contacts R13—1, and then through cam contacts C2 and the read clutch magnet RCM to the ground.

After the document and blank card leave the respective magazines, they will close their related card levers and operate the associated contacts, i. e., in the read unit, the read card lever, and in the punch unit, the die card lever. Closure of these card lever contacts will energize the related relays R4 and R1 respectively and transfer the contacts R1—1 and R4—1 already noted as being in series with the read and punch clutch magnets.

The circuit to the read clutch magnet RCM is then completed through the normally open side of the die card lever contacts R1—1. The circuit to the punch clutch magnet PCM is also changed because it cannot be completed as it was before, since now the normally closed part of the control contacts (the die card lever contacts R1—1) are transferred. Since at the same time relay contacts R4—1 are transferred, the normally open side thereof is now closed in series with the cam contact H2 which has a connection to the punch clutch magnet PCM. This cam contact H2 is operated by the half speed gear and is arranged to be closed on alternate cycles and closed at the end of all even numbered cycles to call into operation the punch clutch magnet PCM for feeding the blank card to be punched in the following odd numbered cycle. The reason for such alternation of feeding of blank cards is apparent from other explanations hereinbefore pointing out the double size of the document advanced into the read unit which requires holding up the feeding of blank cards in the punch unit on alternate cycles.

The feed mechanism for the read unit is in continuous operation since the read clutch magnet RCM is energized on every cycle. However, as already noted, the picker or feed knives for the documents are cam controlled and only feed a document on alternate cycles. Since one document is approximately the size of two standard cards, it will be apparent that there is actually no gap between successive documents except the normal spacing of about one index point between successive documents.

Figure 9:
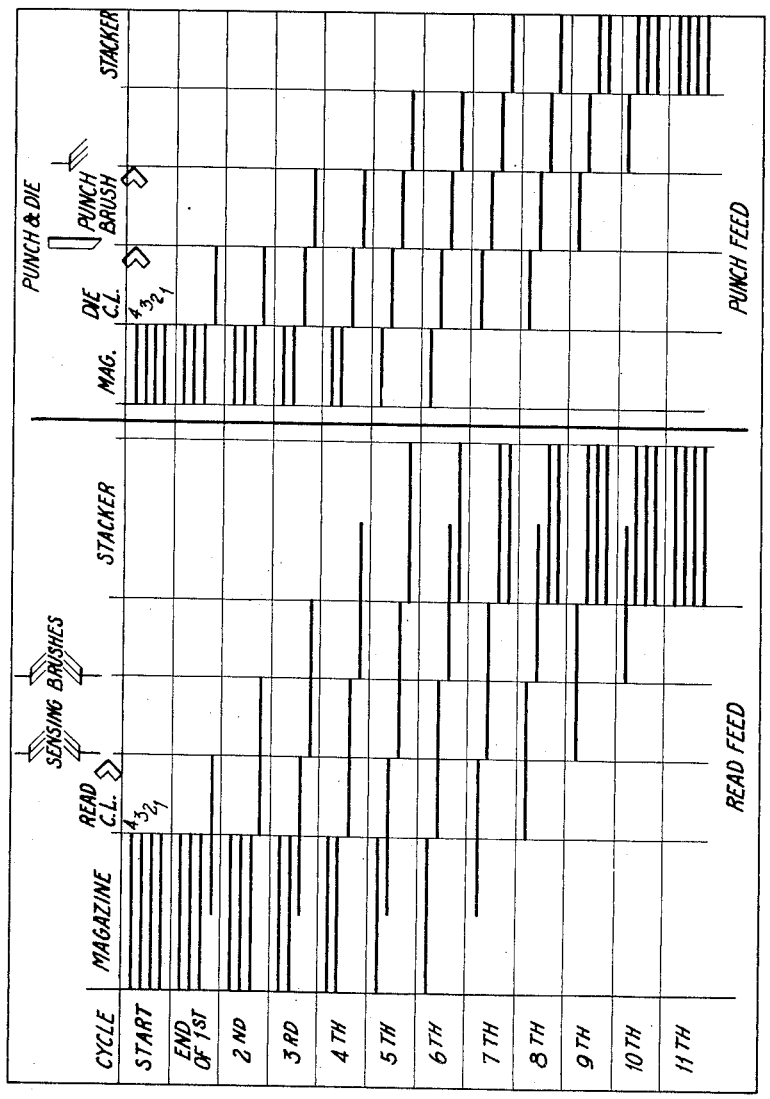
Fig. 9 is a cycle chart showing the positions of the documents and perforated cards at various stages in the operation of the machine.

Before pointing out a sample circuit to illustrate the control over punching by the markings on a document, it is believed well to refer to Fig. 9 which is a cycle chart showing the positions of the successive documents and perforated cards at various stages in the operation of the machine. In this figure the cyclical steps are shown diagrammatically for the reproducing operations associated with four documents. There it is apparent that for continuous operation, the punch brush card lever as well as the die card lever and the read card lever must be operated to call in associated control relays for maintaining running circuits. The punch brush card lever is not closed until the end of the third cycle and therefore the start key must be depressed successively or long enough to close the punch brush card lever. The machine will stop after the last card has left the punch magazine. It will therefore then take four cycles of operation to clear the machine of cards. After the last document has been read in the reading unit, the read card lever and the die card lever open, transferring related contacts R4—1 and R1—1 to the normally closed condition. This permits impulsing of both control clutches on every cycle when running documents and cards out of the machine.

Returning now to the document reading controls illustrated generally at the top of Fig. 1b, it is seen that the document D is illustrated as if it were two separate pieces of material. This is merely a diagrammatic illustration and is so arranged to provide room for showing the wiring for the four lines of cooperating mark sensing brushes. However, it will be realized that the document D is always in one piece and is sensed simultaneously by all four lines of brushes as shown in Fig. 5, where it is clear that two lines of twenty sets of brushes read the top face and two other lines of brushes read the bottom face. In all there are eighty sets of brushes in four lines of twenty sets per line. Each set of brushes includes a center brush 15 and two outer brushes 16. The center brush 15 is wired to a plug socket such as 216, and the two related outer brushes 16 are close thereto but not touching and are independently connected to a wire 217 which is impulsed from line 202 through circuit breaker contacts C7—C10. When a conductive mark 218 on the passing document D comes under the set of brushes, a circuit is completed through either or both outer brushes 16 and into the center brush 15. The timing of such a mark reading impulse is of course determined by the placement of the mark in the column of index points and so selects the punch position which at the time is on the blank card passing under the line of punches.

The machine is provided with eighty punch magnets PM (Fig. 1b) which are energized through the medium of impulses directed to the plug sockets 219 and 226, which impulses control the electronic tubes T1—T80, only two of which are shown in Fig. 1b, but others of which are wired identically. Under most conditions, the plug sockets 219 will be plugged to one or more of the plug sockets 216 to cause the relays to be energized under control of the data designating marks on the documents. The purpose of the plug sockets 226 is to enable the punch magnets to be rendered selectively effective only under certain prescribed conditions which may involve the use of timed impulses from cam contacts or emitters.

Each of the punch magnets PM is associated with one of the tubes T1, etc., which are gas tetrodes of a type commonly known as a "thyratron" and are of the screen grid type. Conveniently, a tube of the miniature type commercially designated 2D21 is used and arranged so that it requires simultaneous impulses on both the control grid and screen grid to render the tube conductive and energize the punch magnet in its plate circuit. This is done by operating the control grid which is connected to a reading brush plug socket and the screen grid which is connected to a timing contact plug socket, under such a bias that a change in the bias on one grid arising from an operating impulse being delivered thereto is insufficient to fire the tube unless a properly valued timing impulse is simultaneously applied to the other grid. The tubes, therefore, act in a sense as impulse mixers which require specific pulse relationships before the tubes are rendered conductive or "fired."

A sample reading circuit may now be traced through one set of reading brushes and one tube T1 and one punch magnet PM, both representative of eighty such connections.

The mark sensing circuit includes line 202 (Fig. 1b) circuit breaker contacts C7–C10, wire 220, the reproducing selection relay contacts R12—7 and R12—8 now closed, wire 221, cam contacts H1, wire 217, brushes 16, a conductive data mark 218, the central brush 15, plug socket 216, a plug wire to socket 219 and through the control grid of the thyratron T1 and to the ground. Although this read impulse alone tends to make the tube conductive, it is not sufficient to change the bias enough to make the tube fire to pick up the punch magnet PM. The tube is of the multiple control element variety and the screen grid is adapted to be connected through other impulsing controls so that the tube is made effective at only those index points for receiving conductive marks. In other words, any extraneous written matter, carbon specks, etc., between index points become ineffective because of the secondary control circuit about to be traced. The secondary sensing circuit also includes line 202, circuit breaker cam contacts C7–C10, wire 220, relay contacts R12—7 and R12—8, wire 221, cam contacts H1, wire 217 and plug socket 223. This socket 223 is connected either directly to the tube socket 226 or to the socket 224 of one of a set of read control cam contacts C11 operated as a circuit breaker to close at certain index point areas in the cycle. A direct connection is for reading all twelve index points and the connection through C11 is for only a certain document area. The contact of circuit breaker C11 is connected to a socket 225 which in turn is connected to the control socket 226 of the thyratron T1. From socket 226, a regular series of impulses are directed through the screen grid and to the ground during each reading cycle of the machine. However, when such impulses occur alone and in the absence of similar impulsing through mark sensing socket 219, they are ineffective to cause the tube to fire. However, when any one of such a series of control impulses is accompanied by an impulse through socket 219 significant of the sensing of a mark, then the double change of bias of both control elements of tube T1 is sufficient to cause it to become conductive and a circuit is directed through the related punch control magnet PM as follows: line 202, circuit breaker contacts C7–C10, cam contacts P1, wire 227, magnet PM, wire 228, to the plate of thyratron T1 and across the tube to the cathode and then to the ground. Cam contacts P1 are held closed during the reading operation of the cycle and then open to prepare the electronic circuit for a new sensing operation.

Although not illustrated, the plug connection leads to the sensing brushes and to the thyratrons are all protected with grounded shields.

In the example just given for the control of reading by joint control through thyratron sockets 219 and 226, it is noted that the connection to socket 225 is optionally directed through cam contacts C11 for the purpose of screening out written material or marks or any conductive material occurring at certain index points. For example, in census work it is desirable to use some index point areas to write or print in a name, address, or other comments of a non-recurring variety. Of course such writing is not in code and the area it covers must be blocked off from sensing control. This is done by cam contacts C11-C19 which are controlled with specific durations according to the requirements for document field screening. They close to allow operation in marked fields for information to be punched and open to filter out information written or printed in allocated areas of the document. On the timing chart the times of closure of these cam contacts are not shown because they are of optional duration for one, or a series, or several index points of a column or series of columns.

Other controls are provided for a wider range of reproducing punch control such as the elimination of sensing in areas including one or more entire columnar index point areas. These additional controls are also of the electronic variety and involve the use of thyratrons TH15 and TH18 (Fig. 1b) which are illustrative of a set of such devices provided as class selectors for either eliminating reading in columnar document portions or the rearrangement of columns of marked information in its transferal to the punched card. In other words, the class selectors in their effect on the sensing circuits are so arranged as to eliminate or prevent sensing of marks in any part of the document and have the further control of sensing such marks in one part of the document and rearranging such information in the transferal to the punched controls. These class selectors may operate a single set of class selection contacts for the X sensing of a document or they may operate a bank of contacts to alter the placement of entire fields of information in transferal from documentary form to the perforated card form.

Referring back to a simple case of control over a punch magnet which may be independent of the read control cam contacts C11-C19 and the class selector electronic devices and instead only involve the emitter E shown at the top of Fig. 1b. This emitter E may be plugged in between socket 223 and socket 226 so that only selected index point positions of a column are effective to cause firing of the punch control tube T1. In other words, in taking the place of cam contacts C11, the emitter E is more flexible in that the common socket C of the emitter can be plugged to socket 223 and then any one or any desired group of the twelve index point spots may be connected together and plugged to socket 226 so that it is entirely possible to fire the tube under control of marks occurring in just a certain portion of the related column on the document.

For class selection and class elimination control, i. e., to select or eliminate reproduction of one or all columns under control of X or Y marks on the document, one or more of the class selector electronic devices TH15 and TH18 are used. These devices are plugged through the emitter to be picked up only at either the 11 index position or the 12 index position for sensing of X or Y special marks which determine whether data associated therewith is to be punched or eliminated or transferred between the sensing and punch control circuits. Taking the class selection tube TH15 as an example, the plug socket 232 related to one of the control grids may be plugged to socket 231 which is the 80th column brush set in the upper line of brushes cooperating with the document D. It is proposed that through socket 231 there will be allowed only the impulse relating to a conductive mark in the 11th index position of the 80th column. In order that the tube TH15 should have such selective control the other control grid thereof is connected through related plug socket 234 to the plug socket 233 of the 11th spot on emitter E. The common socket C of the emitter is then plugged to one of the read control impulse sockets 223 associated with the read circuit already mentioned as carrying a regular series of impulses through the circuit breakers C7-C10 to the reading devices. Therefore none of the other conductive marks of the 80th column are controlling over the class selector but when a mark in the X position is encountered in that column, impulses are carried simultaneously to both sockets 232 and 234 of the control class selector thyratron TH15 and the tube is made conductive and a class selector relay R15 in series therewith is picked up by the following circuit: line 202, cam contacts P6 held throughout the document reading operation of the cycle, wire 240, relay R15, the plate and cathode elements of tube TH15 and to the ground. At the bottom of Fig. 1b, it is noted that relay R15 shifts or transfers a series of class selection contacts R15—1-R15—4. These class selection contacts are pluggable to be placed in a variety of ways between the sockets of the reading brushes and the sockets of the punch control tubes so that various information on the document may be selectively transferred, reproduced or eliminated. For example, if it is desired to eliminate certain information under class selection control, then the plug socket 236 is connected to socket 216 and the other class selection socket 237 is connected to a control tube socket such as socket 219. Then upon detection of an X mark, the contacts R15—1 are shifted and the circuit connections are broken to eliminate the punch control impulse which would otherwise be directed to tube T1 to control the punch magnet. For class selection of information, the connection from plug socket 219 is made to socket 238 instead of socket 237 and then upon operation under X mark control, the contacts R15—1 serve to make a connection between the reading brushes and the punch controls whenever an X mark is found.

In a similar fashion, connection from plug sockets 236 and 238 may be made between any of the reading brush sockets and any of the punch control tubes to transfer data from one field to another so that marks in one portion of the document can control perforations in any part of the card being perforated. Three other class selector tubes are provided and they each have a control relay such as relay R18 to exercise class selection control over the sets of contacts shown at the bottom of Fig. 1b as relating to relays R16, R17 and R18.

It will be noted with reference to Fig. 5 that document D is moving in synchronism with the movement of the blank card under the punches controlled by magnets PM. Therefore when a conductive mark is encountered, the result is an impulse through the connected punch magnet PM and the punch is operated to perforate the blank card at an index position agreeing with the position of the conductive mark.

The electrical controls described hereinbefore relate mainly to control for reproduction, i. e., sensing of conductive marks to cause perforation of a blank card. The machine is suited for another style of operation independent of the document reading portion and effective without such documents. This is known as gang punching control wherein a pre-punched master card is placed in the magazine of the punch unit below a set of blank cards and then this master card runs ahead of the blank cards and passes through the punch station without being affected and passes over to the punch reading brushes 19 and there is sensed to control the punching of the first blank card. Then the first blank card in turn is advanced over the punch brushes 19 and it in turn perforates the second blank card. This operation continues until all blank cards are punched to correspond with the first master card. A series of such master cards may be placed in magazine P and there interspersed between groups of blank cards and punched with an X perforation in some selected column to make them distinctive from the blanks and they are sensed upon emergence from the punch magazine by the X sensing brushes 17 which control the punch devices so as to eliminate or suspend punching control while interspersed master cards are passing. Therefore a succession of master cards are adapted to control punching of a succession of groups of blank cards without affecting the perforations originally placed in the master cards.

In the present machine, since it is primarily for sensing large-sized marked documents, there is need for disabling certain controls and enabling other controls to shift from reproducing to gang punching operation.

Referring to Fig. 1a, one of the controls disabled is the connection between plug sockets 208 and 209 which is made to pick up relay R12 when reproducing control is desired. Now it is assumed that gang punching control is the style of operation desired. The plugging to relay R12 is disabled and other plug connections are made between sockets 242 and 243 to call into operation a relay R13 which has related contacts in different parts of the machine to cut out the reproducing style of operation. For example, the normally closed contacts R13—1 in series with the read clutch magnet RCM are open to disable reading operation by preventing the documents from being fed.

The starting circuit used for gang punching is similar to the one described with relation to reproducing except that the relay contacts R5—1, R12—4 and R3—2 are shunted by relay contacts R13—2. The holding circuit for the start relay R8 is also similar to that used in reproduction with the exception of the use of relay contacts R3—1 which are arranged in shunt around the relay contacts R4—3 and R5—2 relating to the read unit card lever and magazine lever controls now left in the normal positions. The motor control relay HD1 and the motor hold relay R7 are controlled in the same manner as described hereinbefore with relation to reproduction.

The punch clutch magnet PCM is energized as it was before on the first cycle. On succeeding cycles, the die card lever is closed and the associated relay contacts R1—1 are transferred. Then the punch control circuit is completed through wire 245 and the contacts R12—2 now closed because of disablement of relay R12 for gang punching operation.

Another preliminary control that is set up for punching is the one involving the relay R14. At the middle of Fig. 1a, it is seen that plug connections can be made between line 205 and relay R14 to call it into operation whenever punching control is desired.

Referring back to Fig. 1b, it will be assumed that a master card is passing under the punch brushes 19 and the object is to effect control thereby over the punch magnet PM to gang punch a following blank card and succeeding cards. An example of a gang punching control circuit may be traced as follows: the gang punch control circuit includes line 202, circuit breakers C7–C10, cam contacts P1, punch brush card lever relay contacts R6—3 and R6—4, normally closed X elimination relay contacts R10—3 and R10—4, common brush 246, contact roller 247, and then through perforations in the card as detected by brushes 19, plug socket 235 and a plug wire to socket 219 and to one control element of tube T1 and to the ground. The tube is prepared for firing by other regular index point impulses from the punch control impulse socket 247 and to the tube control socket 226 so that upon sensing any regular index perforation, the tube T1 is made conductive to energize punch magnet PM.

When controlling for gang punching, provisions must be made to prevent the last card of one group from punching the master card of the next group. This control is exercised by the sensing of an X hole in the master cards and thereby effecting operation of a relay R10 to open contacts R10—3 and R10—4 for a cycle to prevent punching while a master card passes the punch station. The X hole in a master card is sensed by a punch X brush 17 which is made effective by relay R2 called into operation by closure of the die card lever relay contacts R1—3. The circuit for relay R2 involves line 205 (at top of Fig. 1b) cam contacts P3, die lever relay contacts R1—3, relay R2 and the ground. Relay R2 then closes a series of contacts R2—1, R2—2 and R2—3, the first of which is connected to the common contact bar 249 of the X brushes 17, the second of which is available at a socket 251 for a selective punch control impulse, and the third of which has a wire connection 250 to one of the two control elements of a tube TH9 which is provided for master card punching control to pick up relay R9 on detection of master card X punching.

In order to eliminate punching of a master card from the last detail card of a preceding group, it is necessary to energize relays R—9 and R—10. Relay R—9 may be energized by plug connecting the respective X brush and socket 253 to punch X socket 254. This will allow TH9 to operate at X time which occurs between 13 and 13.5 index time. At 13 to 13.5 index time P3 is made and a circuit is completed from line 205, P3, R1—3, to relay R2 and ground. As the R2—1 contacts close, a circuit is also completed from line 205, P3, R1—3, R2—1, line 255, common contact bar 249, brush 17, socket 253, a plug connection to socket 254, to the second grid of tube TH9 and also to ground. Since the other grid of tube TH9 is also changed in bias through wire 250 and contacts R2—3, the tube is made conductive and relay R9 is picked up by a circuit involving line 202, cam contacts P6, wire 240, relay R9, and through the elements of tube TH9 to the ground.

Relay R9 has associated contacts R9—2 (Fig. 1a) in series with punch control contacts R14—1 and the pickup coil of the punch control relay R10. If both R14—1 and R9—2 are transferred together by the selection of punch control and detection of an X hole, then a circuit is directed through relay R10 by line 207, cam contacts P2, relay contacts R9—2 and R14—1 (both shifted), the pickup coil of R10 and the ground. Relay R10 closes contacts R10—1 to set up a holding circuit through wire 257 and cam contacts C5 leading back to line 207. It is already noted hereinbefore how contacts R10—3 and R10—4 (Fig. 1b) are in series with punch brushes 19 and, when opened, suspend control of perforating.

When relay R9 shifts contacts R9—2 to pick up relay R10, it also closes contacts R9—1 (Fig. 1a), to pick up a punch delay relay R11. The delay relay circuit includes line 207, cam contacts P2, relay contacts R9—1, cam contacts P4, relay R11 and the ground. A holding circuit for relay R11 is established through relay contacts R11—1, wire 251 and cam contacts C5 connected to line 207. Delay relay R11 also closes contacts R11—2 (lower left of Fig. 1a) in series with line 205 and cam contacts C6 leading to the plug socket 259 which is plugged to a class selector pickup socket such as socket 232 (Fig. 1b) for the purpose of offsetting or changing the fields of gang punching control. This is required when some data is to be punched in the blank cards in a different field from the place it has on the master card. A class selector and a bank of its contacts such as R15—1-R15—4 are used for the offset operation. However, the selector must then be controlled by a punch delay impulse such as that out of socket 259, in order to be operative when the X punched master card has moved from the X brush 17, past the die and over to the punch brushes 19.

If the documents D fail to feed properly and in some way get jammed in the read station or stacker, this is detected by the closure of the jam contact 260 which is connected in series between line 207 and the pickup coil of a jam control relay R19. A holding circuit for relay R19 is set up through its contacts R19—1 and the contacts RB of a reset button.

When called into action by a jam, relay R19 not only opens contacts R19—2 in series with the stop switch contacts SS governing the start relay R8, but it also closes contacts R19—3 in series with a jam light JL. Therefore, a visible indication is made of the trouble, and the machine is stopped because relay R8 is dropped and allows contacts R8—4 to shift back to deenergize motor control relay HD1 and open contacts HD1a in series with motor M.

In addition to the Patent Re. 21,133 mentioned hereinbefore, there are other related reproducer Patents 2,053,067, 2,104,542, 2,174,702, 2,372,909, and 2,448,781 which may be referred to for further illustration of specific portions of the standard mechanical and electrical controls of the reproducer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for perforating a record under control of a document having areas for receiving writing and index points for conductive data marks, both of said areas being adjacent in the same column with the conductive marks controlling over perforation, means for sensing said marks, means for feeding said document to pass the written and conductive marks past said sensing means, means for perforating a record to correspond with the sensed conductive marks, means under control of said sensing means for controlling said perforating means, and means for suspending operation of said controlling means while said sensing means is cooperating with the area of writing on said document.

2. The machine set forth in claim 1 in which said controlling means includes a multiple element electronic control device having a plurality of control elements normally conditioned to keep the device nonconductive, means for connecting one control device to said suspending means to be prepared for impulsing during the period in which the document is sensed in the conductive mark-receiving area, and means for connecting the other control element to be impulsed upon the sensing of a mark to render the device conductive to control said perforating means.

3. The machine set forth in claim 1 in which said control device is a multiple element electronic tube having a plurality of control grids normally biased to keep the tube non-conductive, an impulse emitter, means for connecting said emitter to one of said grids to be prepared for impulsing only during the period in which the document is sensed in the conductive mark-receiving area and means for connecting the other grid to the document sensing means to be changed in bias to impulse a punch control magnet upon the sensing of any conductive mark.

4. In a device for sensing indicia at index points on both sides of a record element, there being four decks of such index points with two decks on each face of the element, four lines of sensing brushes, one line for each deck of index points, said lines of brushes being paired with lines of a pair being directly opposite each other on opposite sides of the element, said pairs of lines being spaced apart approximately one-half the height of the element, individual brush sets in said lines for separate columns of index points, said brush sets being alternated in position in said paired lines so that a brush set of one line is opposite the space between two adjacent brush sets of the opposite line, record perforating means having a single line of punches, means for operating said punches, and means under control of all brush sets of all four lines for controlling operation of said operating means concurrently from all four decks of indicia on said element.

5. In a machine for row by row sensing and reproducing a set of perforated record cards under control of a set of marked double decked pattern cards, said pattern cards being at least double the width of said record cards along the line of feed and said decks of marks comprising two sets of plural ordered index points in tandem arrangement along the axis of feed and said marks being sensed row by row and the perforations punched row by row, card feeding means for feeding cards from both sets across the rows and along the short axis in synchronism, means for feeding the record cards with intermittent movement at half the rate of feed of the double decked pattern cards, means for simultaneously sensing conductive marks on both decks of the pattern cards, perforating devices, and means under control of the mark sensing devices for operating the perforating devices to punch the record cards by rows to represent the data recorded on both decks of the marked pattern cards.

6. In a machine for punching a set of perforated record cards under control of a set of marked pattern cards, said pattern cards being at least double the width along the axis of feed of the record cards and said marks being arranged in two pairs of tandem decks of plural ordered sets of several rows of index points on each pattern card with a pair of tandem decks on each face of the pattern card, a line of punches for punching the record card index points row by row, four separate lines of mark sensing brushes, one for each deck, means for feeding the pattern cards, means for feeding the record cards at half the rate of feed but in synchronism with the pattern cards and with a movement transverse to the lines of punches and brushes, respectively, for sensing the decks in tandem along the axis of feed of the pattern cards, means for operating said punches, and means under control of said mark sensing brushes for all decks for simultaneously controlling the operation of said punch operating means.

References Cited in the file of this patent

UNITED STATES PATENTS

| Number | Name | Date |
| --- | --- | --- |
| Re. 21,133 | Lake | June 27, 1939 |
| 1,962,732 | Bryce | June 12, 1934 |
| 2,007,391 | Bryce | July 9, 1935 |
| 2,107,008 | Lasker | Feb. 1, 1938 |
| 2,150,256 | Warren | Mar. 14, 1939 |
| 2,171,556 | Higginbottom | Sept. 5, 1939 |
| 2,254,931 | Bryce | Sept. 2, 1941 |
| 2,275,396 | Johnson | Mar. 3, 1942 |
| 2,353,061 | Oldenboom | July 4, 1944 |
| 2,416,625 | Hooper | Feb. 25, 1947 |
| 2,448,760 | Armbruster | Sept. 7, 1948 |